(12) United States Patent
Shamroukh et al.

(10) Patent No.: US 6,988,346 B2
(45) Date of Patent: Jan. 24, 2006

(54) STRAP HOLDING DEVICE

(75) Inventors: Louay A. Shamroukh, Walnut Creek, CA (US); Mark G. Crawford, Visalia, CA (US)

(73) Assignee: Simpson Strong-Tie Company, Inc., Dublin, CA (US)

(*) Notice: Subject to any disclaimer, the term of this patent is extended or adjusted under 35 U.S.C. 154(b) by 0 days.

(21) Appl. No.: 10/000,678

(22) Filed: Oct. 30, 2001

(65) Prior Publication Data

US 2003/0079419 A1   May 1, 2003

(51) Int. Cl.
*E04C 3/02*   (2006.01)
*E04C 3/18*   (2006.01)

(52) U.S. Cl. .......................... 52/693; 52/712; 52/707; 52/695; 52/656.1; 52/654.1

(58) Field of Classification Search ................. 52/707, 52/638, 657, 92.2, 167.1, 167.3, 712, 317, 52/654.1, 693, 695, 656.1, 655.1, 696, 715; 403/408.1, 384, 385, 187, 188
See application file for complete search history.

(56) References Cited

U.S. PATENT DOCUMENTS

| | | | |
|---|---|---|---|
| 651,139 A | 6/1900 | Gays | |
| 688,230 A | 12/1901 | Isgrig | |
| 797,474 A * | 8/1905 | Walker | 52/63 |
| 1,106,845 A | 8/1914 | Ream | |
| 1,204,956 A | 11/1916 | Day | |
| 1,214,738 A * | 2/1917 | Wolf | 5/290 |
| 1,378,448 A * | 5/1921 | Gilbert | 52/93.1 |
| 1,458,498 A * | 6/1923 | Piel | 52/90.1 |
| 1,461,704 A | 7/1923 | Bonsall | |
| 1,514,577 A | 11/1924 | Burrell | |
| 1,523,970 A | 1/1925 | Jakob | |
| 1,533,041 A * | 4/1925 | Slater | 52/638 |
| 1,558,239 A | 10/1925 | Costello | |
| 1,614,334 A | 1/1927 | Wright | |
| 1,656,741 A | 1/1928 | Lane | |
| 1,685,729 A | 9/1928 | Stone | |
| 1,880,480 A | 10/1932 | Ragsdale | |
| 2,037,736 A * | 4/1936 | Payne et al. | 403/173 |
| 2,042,370 A | 5/1936 | Walker | |
| 2,116,263 A | 5/1938 | Harbaugh | |
| 2,302,101 A * | 11/1942 | Boydstun | 52/210 |
| 2,338,435 A * | 1/1944 | Hoyt | 403/188 |
| 2,567,586 A | 9/1951 | Werder | |
| 2,619,887 A * | 12/1952 | Burrows | 172/259 |

(Continued)

FOREIGN PATENT DOCUMENTS

AU              484192         *   6/1997

(Continued)

OTHER PUBLICATIONS

"The Stabilizer™ Truss Brace." Product Information. Mitek Industries, Inc., Chesterfield, MO 2001. Retrieved from the internet: URL http://www.mitek-us.com/mitekproducts/stabilizer.asp.

(Continued)

*Primary Examiner*—Phi Dieu Tran A
(74) *Attorney, Agent, or Firm*—James R. Cypher; Charles R. Cypher

(57) ABSTRACT

The present invention provides a connection having a plurality of parallel structural members. The structural members are bridged by strap member, preferably light gauge steel. The end of the strap member is held in place by an overlapping strap holder. Fasteners hold the strap holder and the strap to the underlying structural member, with at least one passing through only the strap holder into the first side of the the first structural member.

18 Claims, 6 Drawing Sheets

U.S. PATENT DOCUMENTS

| | | | |
|---|---|---|---|
| 2,686,959 A | | 8/1954 | Robinson |
| 2,806,495 A | | 9/1957 | Merkle et al. |
| 2,856,646 A | * | 10/1958 | Latimer et al. ............ 52/223.6 |
| 2,947,119 A | | 8/1960 | Puckett, jr. |
| 2,963,127 A | | 12/1960 | Manville |
| 2,964,807 A | | 12/1960 | Kennedy |
| 3,000,145 A | | 9/1961 | Fine |
| 3,010,162 A | | 11/1961 | Klein |
| 3,011,229 A | * | 12/1961 | Mutchnik ................... 403/188 |
| 3,152,671 A | | 10/1964 | Mallory, Jr. |
| 3,201,874 A | | 8/1965 | Christy |
| 3,332,196 A | * | 7/1967 | Tuttle .......................... 52/693 |
| 3,335,993 A | | 8/1967 | Tuttle |
| 3,389,885 A | | 6/1968 | Friedman et al. |
| 3,422,585 A | | 1/1969 | Dismukes |
| 3,467,418 A | * | 9/1969 | Redditt ....................... 182/229 |
| 3,591,997 A | * | 7/1971 | Tennison et al. ......... 52/718.02 |
| 3,875,719 A | | 4/1975 | Menge |
| 3,959,945 A | | 6/1976 | Allen |
| 3,988,872 A | * | 11/1976 | Adamson et al. ........... 403/230 |
| 4,016,698 A | * | 4/1977 | Rogers ...................... 52/656.1 |
| 4,040,232 A | * | 8/1977 | Snow et al. ................ 52/739.1 |
| 4,171,172 A | * | 10/1979 | Johnston ...................... 403/71 |
| 4,234,174 A | | 11/1980 | Cardono |
| 4,237,614 A | | 12/1980 | Williams |
| 4,246,736 A | | 1/1981 | Kovar et al. |
| 4,253,224 A | | 3/1981 | Hickman et al. |
| 4,253,649 A | | 3/1981 | Hewson |
| 4,322,064 A | | 3/1982 | Jarvis |
| 4,339,903 A | * | 7/1982 | Menge ......................... 52/657 |
| 4,342,177 A | * | 8/1982 | Smith ......................... 52/93.1 |
| 4,350,279 A | | 9/1982 | Haley |
| 4,361,999 A | | 12/1982 | Sidney |
| 4,370,843 A | | 2/1983 | Menge |
| 4,420,921 A | | 12/1983 | Hardin |
| 4,422,792 A | | 12/1983 | Gilb |
| 4,490,956 A | | 1/1985 | Palacio et al. |
| 4,503,652 A | | 3/1985 | Turner |
| 4,524,554 A | | 6/1985 | Simpson |
| 4,563,851 A | | 1/1986 | Long |
| 4,570,407 A | | 2/1986 | Palacio et al. |
| 4,604,845 A | | 8/1986 | Brinker |
| 4,625,415 A | | 12/1986 | Diamontis |
| 4,637,195 A | | 1/1987 | Davis |
| 4,669,235 A | | 6/1987 | Reinen |
| 4,704,829 A | | 11/1987 | Baumker, Jr. |
| D293,416 S | | 12/1987 | Krueger |
| 4,712,340 A | | 12/1987 | Sogge |
| 4,843,726 A | | 7/1989 | Ward |
| 4,928,867 A | | 5/1990 | Jensen |
| 4,958,814 A | | 9/1990 | Johnson |
| 5,031,886 A | | 7/1991 | Sosebee |
| D318,785 S | | 8/1991 | Dean |
| 5,129,153 A | | 7/1992 | Burns, Sr. |
| 5,161,345 A | * | 11/1992 | Sobjack, Sr. ............. 52/745.05 |
| 5,315,803 A | | 5/1994 | Turner |
| 5,324,132 A | | 6/1994 | Hunter et al. |
| 5,367,853 A | | 11/1994 | Bryan |
| 5,388,378 A | * | 2/1995 | Frye ............................. 52/23 |
| 5,407,182 A | | 4/1995 | Hartley |
| 5,412,920 A | | 5/1995 | Hess |
| 5,490,334 A | | 2/1996 | Payne |
| 5,502,942 A | | 4/1996 | Gras et al. |
| 5,555,694 A | | 9/1996 | Commins |
| 5,606,837 A | | 3/1997 | Holizlander |
| 5,628,119 A | | 5/1997 | Bingham et al. |
| 5,638,655 A | | 6/1997 | Keck |
| 5,699,639 A | | 12/1997 | Fernandez |
| 5,884,411 A | | 3/1999 | Raber |
| 5,884,448 A | | 3/1999 | Pellock |
| 5,899,042 A | | 5/1999 | Pellock |
| 5,937,531 A | | 8/1999 | Menk et al. |
| 5,937,608 A | * | 8/1999 | Kucirka ....................... 52/695 |
| 5,992,122 A | | 11/1999 | Rohrmoser et al. |
| 6,070,336 A | | 6/2000 | Rodgers |
| 6,155,019 A | | 12/2000 | Ashton et al. |
| 6,170,218 B1 | | 1/2001 | Shahnazarian |
| 6,185,898 B1 | | 2/2001 | Pratt |
| 6,230,466 B1 | | 5/2001 | Pryor |
| 6,230,467 B1 | | 5/2001 | Leek |
| 6,463,711 B1 | | 10/2002 | Callies |
| 6,523,321 B1 | | 2/2003 | Leek et al. |
| 6,546,678 B1 | | 4/2003 | Ashton et al. |
| 6,877,291 B2 | * | 4/2005 | Shamroukh et al. .......... 52/702 |

FOREIGN PATENT DOCUMENTS

| | | |
|---|---|---|
| CA | 502492 | 5/1954 |
| DE | 298 19 351 | 3/1999 |
| EP | 1 213 399 A2 | 6/2002 |
| GB | 2039582 A * | 8/1980 |
| GB | 2 163 788 A | 3/1986 |
| GB | 2 228 955 A | 9/1990 |
| WO | WO 96/29180 | 9/1996 |

OTHER PUBLICATIONS

National Evaluation Report, Report No. NER-561. Mitek Stabilizer. National Evaluation Service, Inc., Falls Church, VA. Jul. 2000.

"Truss Products." TEE-LOK Wood Connectors product catalog, p. 10. TEE-LOK Corporation. 1995.

"Truslok Spacing Tools for Fast, Safe Truss Installation." Advertisement. Journal of Light Construction. Sep. 1999.

"Don't Just Space it, Brace-It.™ The Faster, Stronger, Easier Way to Brace Your Trusses." Product brochure. Truswal Systems Corporation, Arlington, TX., publication date unknown.

Guertin, M. "Adjustable Truss Braces." Journal of Light Construction. Mar. 1999, p. 10.

Arnold, R. and Guertin, M., "Installing Gable Roof Trusses." Journal of Light Construction. Dec. 1998, pp. 37-42.

"Truslock Spacing Tools. Space & Brace Trusses Simply by Folding Over." Product brochure. Truslock, Inc., publication date unknown.

Kang-sag TSX Truss Spacer. Product brochure. United Steel Products Company. Montgomery, MN., publication date unknown.

"Commentary and Recommendations for Handling, Installing and Bracing Metal Plate Connected Wood Trusses, HIB-91." Truss Plate Institute, Madison, WI. 1991.

META/HETA/HHETA/HETAL/TSS Embedded Truss Anchors and Truss Seat Snap-In. Simpson Strong-Tie Wood Connectors Catalog, p. 108. Simpson Strong-Tie Company, Inc., 1999.

Technical Bulletin. Coil Strap Alternative Nailing Schedule and Lap Splice Specifications. Simpson Strong-Tie Company, Inc., Dublin, CA. 2001.

"Hulbånd, vindtrækbånd, båndspænder." BMF Handvaerkerkatalog 1989, Section 4, pp. 4.00.0-4.11.1. BMF Bygningsbeslag A/S. Odder, Denmark 1989.

"Lochbänder," "Lochblechstreifen," "Spanngerät Typ 60." BMF product brochure, pp. 5, 8. BMF Baubeschläge GmbH & Co. KG. Denmark 1990.

"BMF Vindafstivningsstem 25." Product brochure. BMF Bygningsbeslag A/S. Odder, Denmark 2000.

"BMF Vindafstivningssystem 40/60." Product brochure. BMF Bygningsbeslag A/S. Odder, Denmark 2000.

"BMFVindafstivningssystem." BMF Vindafstivningssystem product catalog. BMF Bygningsbeslag A/S. Odder, Denmark 2000.

Schoening, Carl. Declaration regarding wood fram demonstration structure. Executed Feb. 18, 2004.

"Zone Four Seismic Solutions." Zone Four. San Leandro, CA. Jan. 20, 1997.

"BMF Windaussteifungssysteme 2002" Product brochure. BMF-Simpson GmBH. Syke, Germany. Oct. 2001.

* cited by examiner

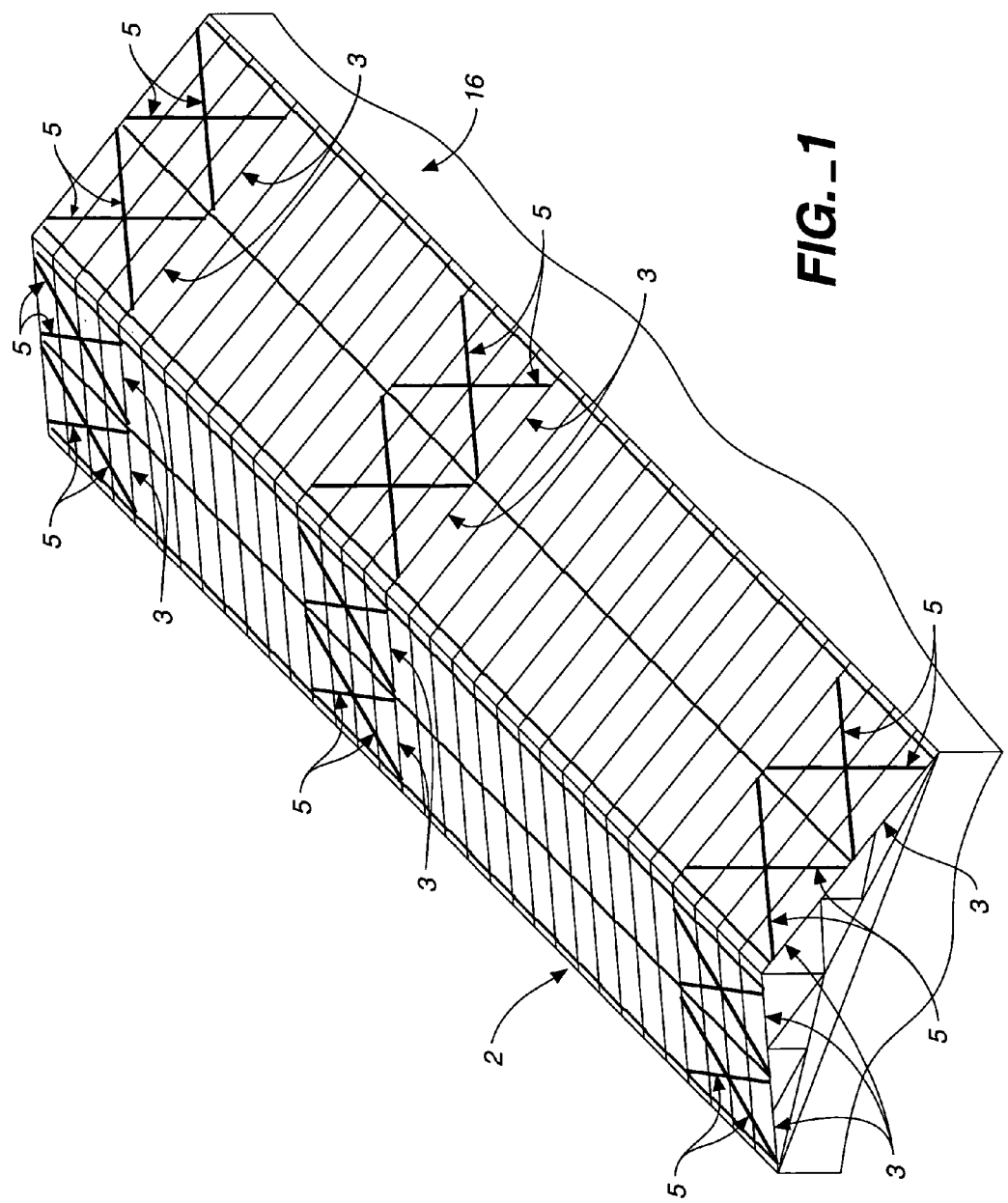
FIG._1

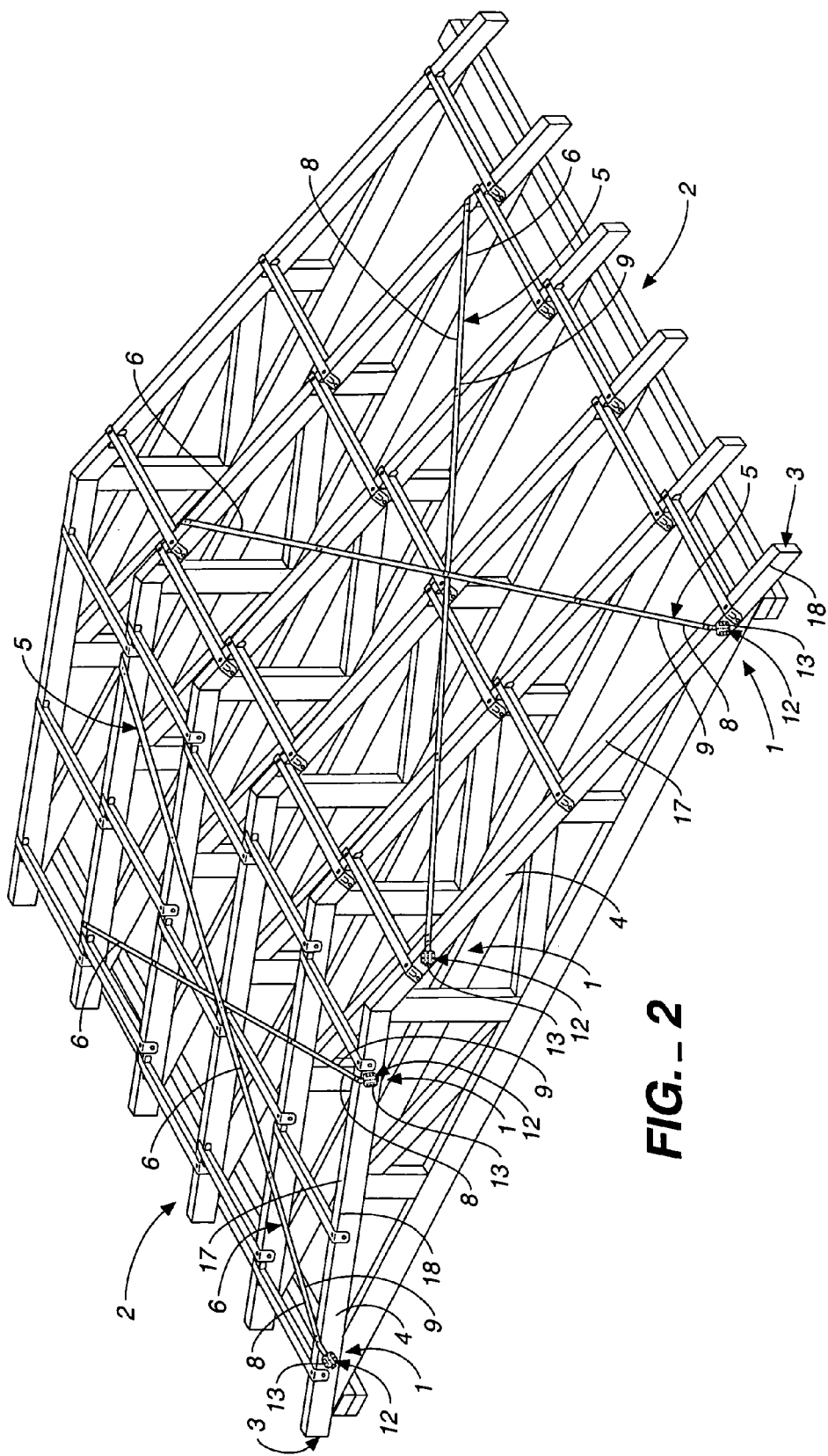
FIG._2

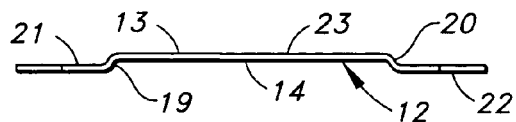
FIG._3
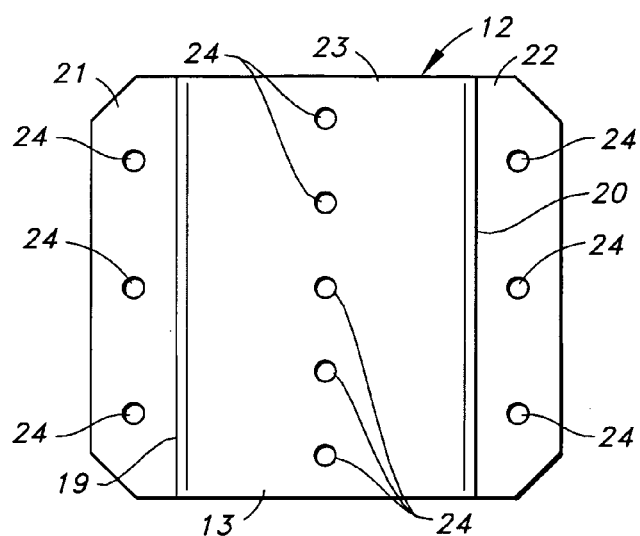
FIG._4
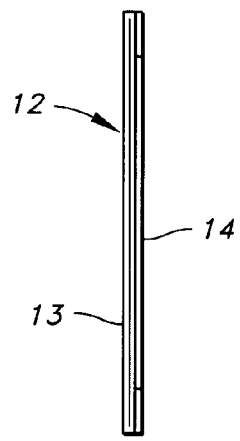
FIG._5
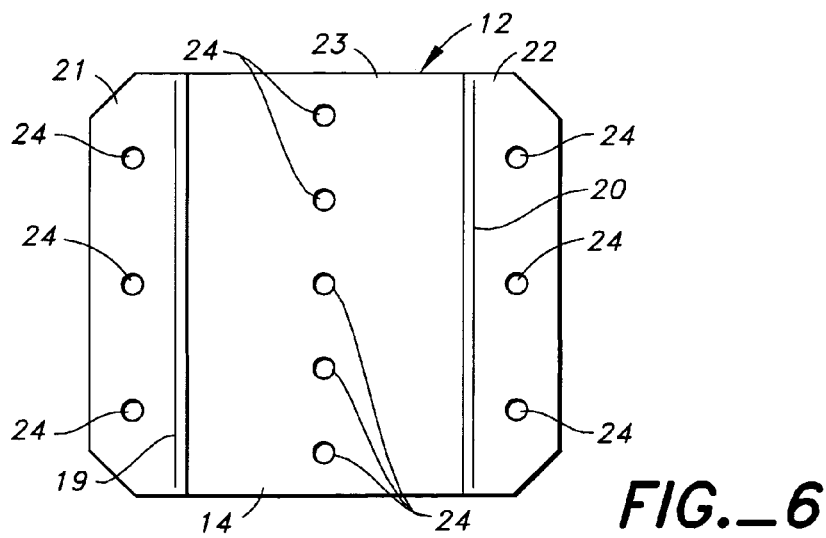
FIG._6

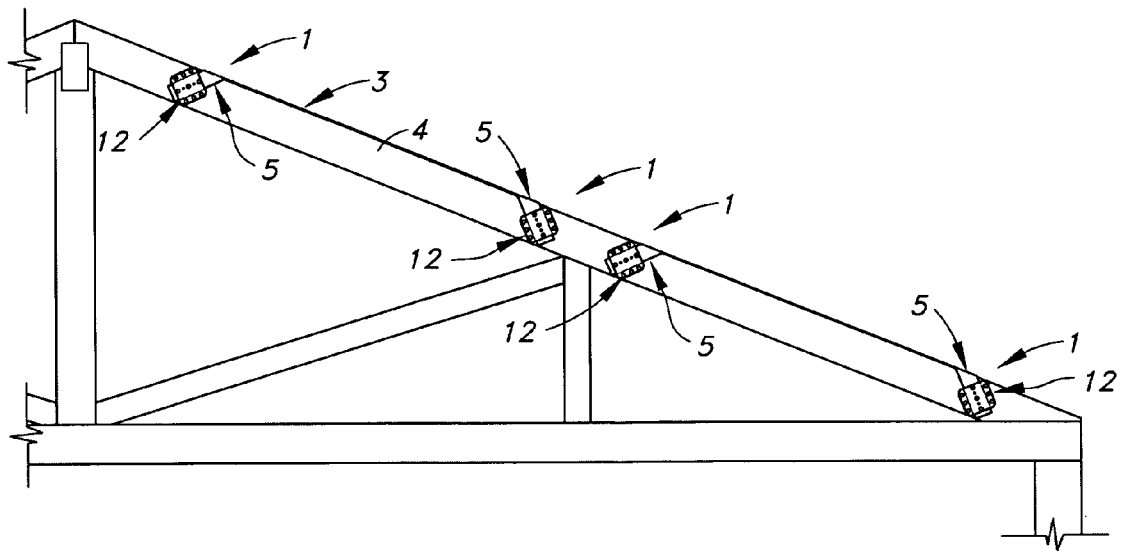
FIG._7
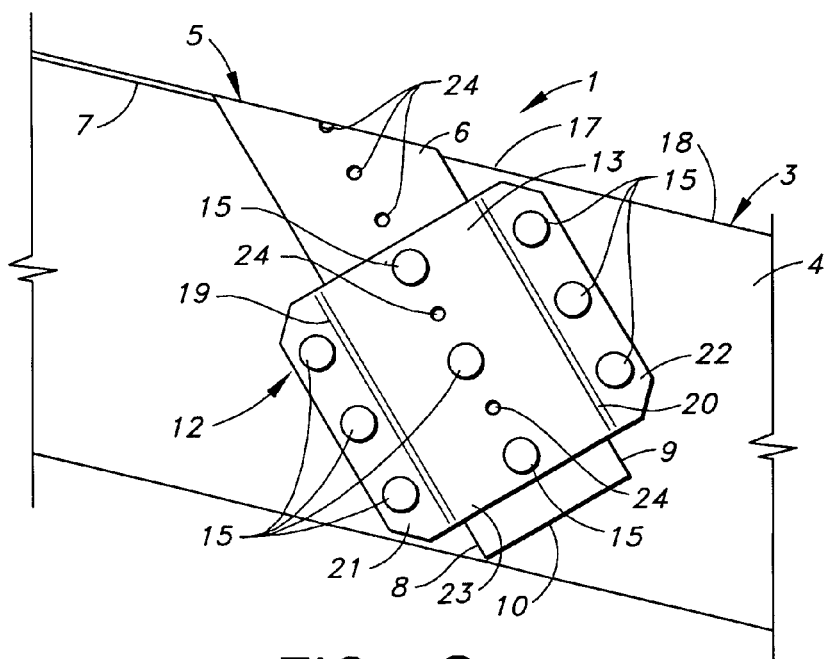
FIG._8

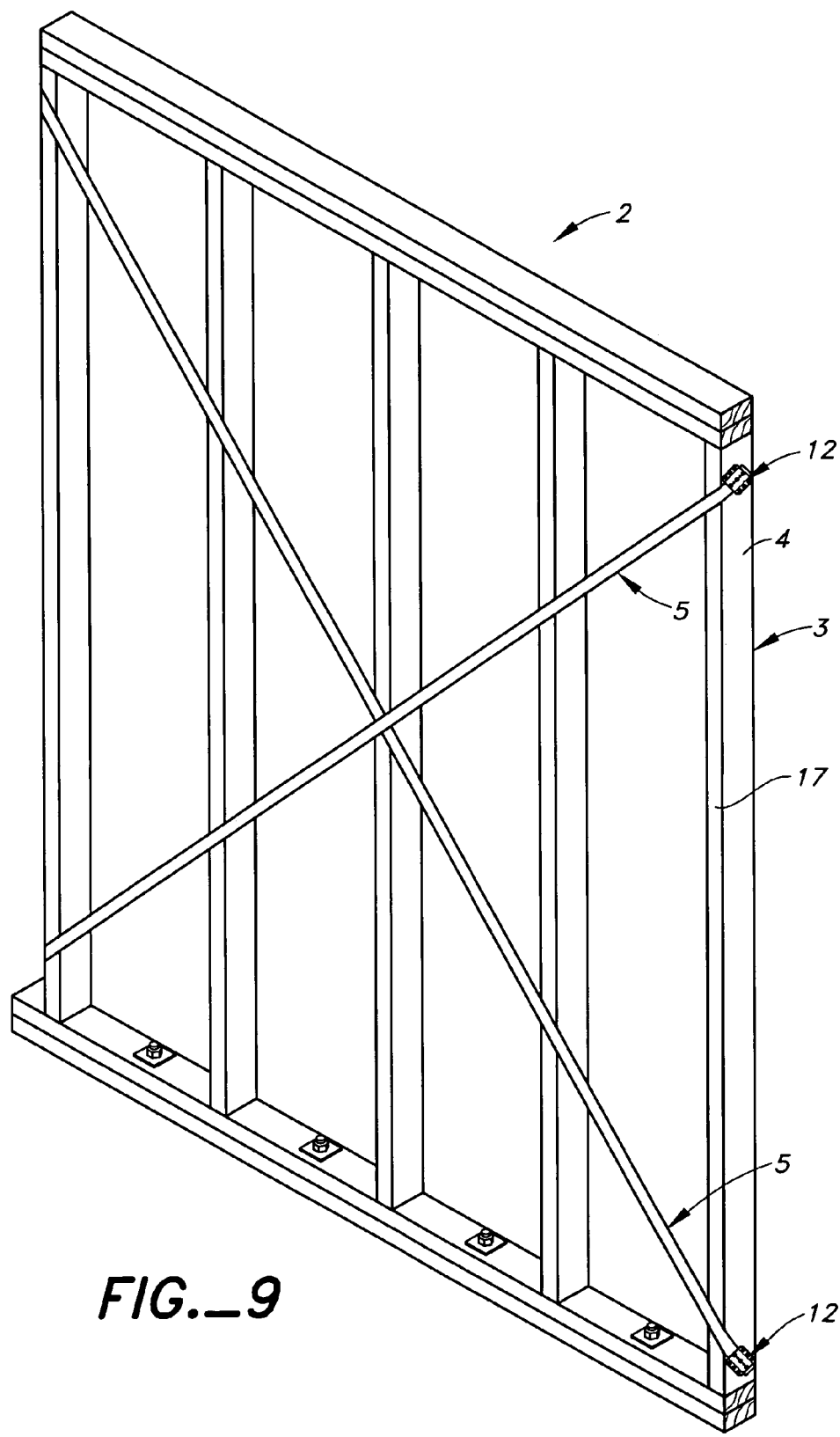
FIG._9

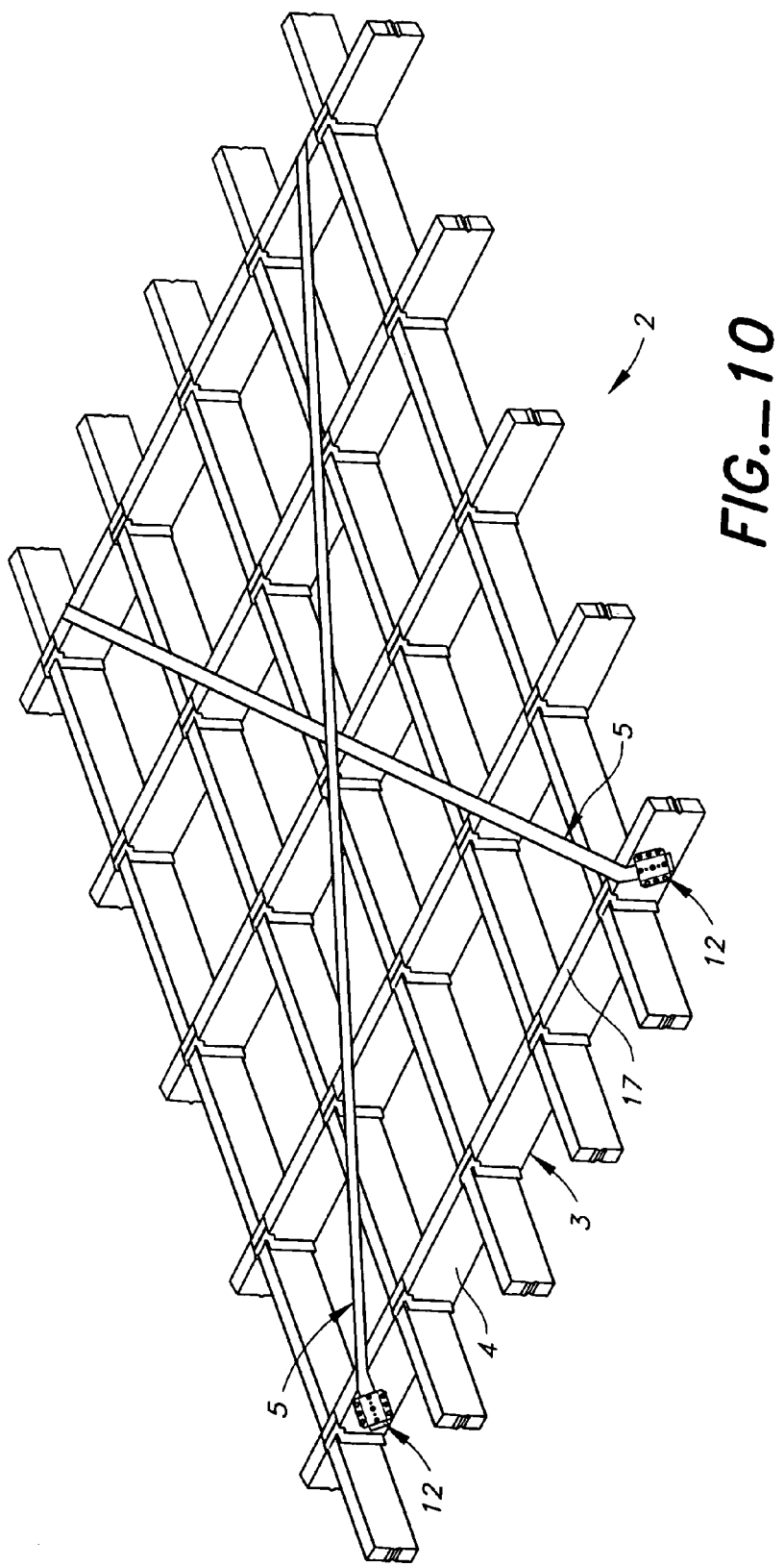
FIG._10

STRAP HOLDING DEVICE

BACKGROUND OF THE INVENTION

The present invention relates to a connection in which a strap bridges a plurality of substantially parallel structural members and is secured by a strap holder, especially where an elongate utility strap is used, typically in pairs forming X bracing, to reinforce roof trusses against forces acting along the length of the roof. Single diagonal braces of this general type are also commonly used in walls in light wood frame construction, and might also be used to brace floor beams or other series of parallel structural members.

SUMMARY OF THE INVENTION

It is an object of the present invention to provide a secure connection between an elongated strap member and a structural member. The present invention improves on the prior art of simply nailing through the strap and into the structural member beneath it. The present invention provides a connection having a plurality of parallel structural members. The structural members are bridged by strap member, preferably light gauge steel. The end of the strap member is held in place by an overlapping strap holder. Fasteners hold the strap holder and the strap to the underlying structural member, with at least one passing through only the strap holder into the first side of the the first structural member.

BRIEF DESCRIPTION OF THE DRAWINGS

FIG. 1 is an isometric view of a roof, showing three sections of roof trusses connected by strap members arranged in X patterns.

FIG. 2 is an isometric view of a plurality of roof trusses, joined by perpendicular bracing and by connections of the present invention.

FIG. 3 is a side elevation view of the preferred embodiment of the strap holder of the present invention.

FIG. 4 is a top plan view of the preferred embodiment of the strap holder of the present invention.

FIG. 5 is a side elevation view of the preferred embodiment of the strap holder of the present invention, perpendicular to the view of FIG. 3.

FIG. 6 is a bottom plan view of the preferred embodiment of the strap holder of the present invention.

FIG. 7 is a side elevation view of a roof truss showing a plurality of connections of the present invention, in particular the interface of first structural member, strap and strap holder.

FIG. 8 is a side elevation view of the strap holder, strap member and first structural member of the present invention, connected by fasteners.

FIG. 9 is an isometric view of an alternate preferred embodiment of the present invention, in which the plurality of substantially parallel structural members are wall studs.

FIG. 10 is an an isometric view of a second alternate preferred embodiment of the present invention, in which the plurality of substantially parallel structural members are floor joists.

DETAILED DESCRIPTION OF THE PREFERRED EMBODIMENT

As best seen in FIG. 2, the preferred form of the present invention is a connection 1 comprising a plurality of substantially parallel structural members 2, a first structural member 3 having a first side 4, a strap member 5 having an upper surface 6, a lower surface 7, a first side edge 8, a second side edge 9, and a first end edge 10, a strap holder 12 having an upper face 13 and a lower face 14, the lower face 14 being dimensioned to interface with the first side 4 of the first structural member 3 and attached only to the first structural member 3 of the plurality of structural members 2, and a plurality of fasteners 15. The lower surface 7 of the strap member 5 interfaces with the first side 4 of the first structural member 3, the lower face 14 of the strap holder 12 interfaces with the upper surface 6 of the strap member 5, extending beyond the first side edge 8 to interface with the first side 4 of the first structural member 3, at least one of the plurality of fasteners 15 passes through both the strap holder 12 and the strap member 5 and into the first side 4 of the first structural member 3, at least one of the plurality of fasteners 15 passes through only the strap holder 12 into the first side 4 of the first structural member 3, and the strap member 5 crosses over the plurality of substantially parallel structural members 2. As shown in FIG. 2, in the preferred embodiment of the present invention, the substantially parallel structural members 2 are the top members of roof trusses 11. The connection 1 of the present invention is paired to create X bracing that reinforces the roof 16 against forces acting primarily along the length of the roof 16, which is otherwise relatively rigid where it joins the wall below, which is typically reinforced by sheathing against shear forces acting along the length of the wall. As shown in FIG. 1, a number of areas of the roof 16 are reinforced with X bracing, which is often required by building codes.

As best shown in FIG. 7 and in detail in FIG. 8 in the preferred embodiment the first structural member 3 further comprises a second side 17 and a first juncture 18 between the first side 4 and the second side 17. The strap member 5 is bent over the first juncture 18 and interfaces with the second side 17.

As best shown in FIG. 3, FIG. 4, FIG. 5, and FIG. 6, in the preferred embodiment the strap holder 12 additionally comprises a first transition line 19 and a second transition line 20, the first transition line 19 and the second transition line 20 dividing the upper face 13 and the lower face 14 into a first attachment portion 21, a second attachment portion 22, and a first securement portion 23 between the first transition line 19 and the second transition line 20, and wherein the first securement portion 23 is dimensioned to closely interface with the upper surface 6 of the strap member 5, the first transition line 19 closely parallel to the first side edge 8 and the second transition line 20 closely parallel to the second side edge 9. In the preferred embodiment, the first transition line 19 and the second transition line 20 are double bends that create a raised securement portion 23 that bisects the middle of the strap holder 12.

As best shown in FIG. 7 and FIG. 8, in the preferred embodiment one or more of the plurality of fasteners 15 passes through the first attachment portion 21 into the first side 4 of the first structural member 3, one or more of the plurality of fasteners 15 passes through the second attachment portion 22 into the first side 4 of the first structural member 3, and one or more of the plurality of fasteners 15 passes through the first securement portion 23, through the strap member 5, and into the first side 4 of the first structural member 3.

As shown in FIG. 2, in the preferred embodiment, the plurality of substantially parallel structural members 2 and the first structural member 3 are the top chords of roof trusses 11 and the top chords of roof trusses 25 are made of wood. As shown in FIG. 10, in an alternate preferred embodiment, the plurality of substantially parallel structural members 2 and the first structural member 3 are floor beams, and the floor beams are made of wood. As shown in FIG. 9, in another alternate preferred embodiment, the plurality of substantially parallel structural members 2 and the first structural member 3 are wall studs. Notwithstanding the above, the substantially parallel structural members 2 may be any such series of structural members, and may made of any material, such as steel. In the preferred embodiment, the fasteners 15 are nails, although they may be screws, bolts or any other type of pin-like fastener.

In the preferred embodiment, the strap member 5 and strap holder 12 are both formed from light gauge steel, but either or both may be formed from other metals or plastics, or any other material that may be formed into the necessary shapes.

In the preferred embodiment, the strap holder 12 is formed with a plurality of fastener openings 24 and the strap member 5 is also formed with a plurality of fastener openings 25.

STRAP HOLDING DEVICE NUMBER LIST

1. Connection
2. Plurality of substantially parallel structural members
3. First structural member
4. First side (of first structural member)
5. Strap member
6. Upper surface (of strap member)
7. Lower surface (of strap member)
8. First side edge (of strap member)
9. Second side edge (of strap member)
10. First end edge (of strap member)
11. Roof trusses
12. Strap holder
13. Upper face (of strap holder)
14. Lower face (of strap holder)
15. Plurality of fasteners
16. Roof
17. Second side (of first structural member)
18. First juncture (between first side and second side of first structural member)
19. First transition line (of strap holder)
20. Second transition line (of strap holder)
21. First attachment portion (of strap holder)
22. Second attachment portion (of strap holder)
23. First securement portion (of strap holder)
24. Fastener openings (of strap holder)
25. Fastener openings (of strap member)

We claim:

1. A connection comprising:
   a. a plurality of substantially parallel structural members;
   b. a first structural member comprising a first side, a second side and a first juncture between said first side and said second side;
   c. a strap member having an upper surface, a lower surface, a first side edge, a second side edge, and a first end edge;
   d. a strap holder having an upper face and a lower face, said lower face being dimensioned to interface with said first side of said first structural member and attached only to said first structural member of said plurality of structural members; and
   e. a plurality of fasteners; wherein
      i. said lower surface of said strap member interfaces with said first side of said first structural member;
      ii. said lower face of said strap holder interfaces with said upper surface of said strap member, extending beyond said first side edge to interface with said first side of said first structural member;
      iii. at least one of said plurality of fasteners passes through both said strap holder and said strap member and into said first side of said first structural member;
      iv. at least one of said plurality of fasteners passes through only said strap holder into said first side of said first structural member; and
      v. said strap member crosses over said plurality of substantially parallel structural members and, in substantially the same plane, said second side of said first structural member, interfacing with said second side of said first structural member, and said strap member is bent over said first juncture.

2. The connection of claim 1, wherein said strap holder additionally comprises a first transition line and a second transition line, said first transition line and said second transition line dividing said upper face and said lower face into a first attachment portion, a second attachment portion, and a first securement portion between said first transition line and said second transition line, and wherein said first securement portion is dimensioned to closely interface with said upper surface of said strap member, said first transition line being closely parallel to said first side edge of said strap and said second transition line being closely parallel to said second side edge of said strap.

3. The connection of claim 2, wherein one or more of said plurality of fasteners passes through said first attachment portion into said first side of said first structural member, one or more of said plurality of fasteners passes through said second attachment portion into said first side of said first structural member, and one or more of said plurality of fasteners passes through said first securement portion, through said strap member, and into said first side of said first structural member.

4. The connection of claim 3, wherein said plurality of substantially parallel structural members and said first structural member are the top chords of roof trusses.

5. The connection of claim 4, wherein said top chords of roof trusses are made of wood.

6. The connection of claim 5, wherein said fasteners are nails.

7. The connection of claim 6, wherein said strap holder is formed with fastener openings.

8. The connection of claim 7, wherein said strap is formed with fastener openings.

9. The connection of claim 3, wherein said plurality of substantially parallel structural members and said first structural member are floor beams.

10. The connection of claim 9, wherein said floor beams are made of wood.

11. The connection of claim 10, wherein said fasteners are nails.

12. The connection of claim 11, wherein said strap holder is formed with fastener openings.

13. The connection of claim 12, wherein said strap is formed with fastener openings.

14. The connection of claim 3, wherein said plurality of substantially parallel structural members and said first structural member are wall studs.

15. The connection of claim 14, wherein said wall studs are made of wood.

16. The connection of claim 15, wherein said fasteners are nails.

17. The connection of claim 16, wherein said strap holder is formed with fastener openings.

18. The connection of claim 17, wherein said strap is formed with fastener openings.

* * * * *